(12) United States Patent
Zhao et al.

(10) Patent No.: US 11,073,237 B2
(45) Date of Patent: Jul. 27, 2021

(54) GIMBAL FRAME, AND GIMBAL AND PHOTOGRAPHING APPARATUS HAVING THE SAME

(71) Applicant: SZ DJI OSMO TECHNOLOGY CO., LTD., Shenzhen (CN)

(72) Inventors: Yanchong Zhao, Shenzhen (CN); Weidong Li, Shenzhen (CN); Guoyao Liu, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 24 days.

(21) Appl. No.: 16/445,903

(22) Filed: Jun. 19, 2019

(65) Prior Publication Data

US 2019/0301664 A1   Oct. 3, 2019

Related U.S. Application Data

(63) Continuation of application No. PCT/CN2016/112788, filed on Dec. 28, 2016.

(51) Int. Cl.
*F16M 11/12* (2006.01)
*F16M 11/18* (2006.01)
(Continued)

(52) U.S. Cl.
CPC .......... *F16M 11/105* (2013.01); *F16M 11/04* (2013.01); *F16M 11/126* (2013.01);
(Continued)

(58) Field of Classification Search
CPC .... G03B 17/561; G03B 15/006; F16M 11/04; F16M 11/105; F16M 11/123;
(Continued)

(56) References Cited

U.S. PATENT DOCUMENTS 3,030,060 A  *  4/1962  Breuer .................. A47H 1/124
                                                    248/265
4,562,985 A       1/1986  Nakatani
                      (Continued)

FOREIGN PATENT DOCUMENTS

CN       101435452 A    5/2009
CN       201277224 Y    7/2009
                  (Continued)

OTHER PUBLICATIONS

World Intellectual Property Organization (WIPO) International Search Report for PCT/CN2016/112788 dated Sep. 27, 2017 7 Pages.

*Primary Examiner* — Tan Le
(74) *Attorney, Agent, or Firm* — Anova Law Group, PLLC

(57) ABSTRACT

A gimbal frame includes a guide rod and a locking mechanism mounted at the guide rod. The locking mechanism includes a tightening member disposed at the guide rod, a transmission member disposed at the guide rod and in transmission engagement with the tightening member, an abutting member disposed at one side of the transmission member, and a driving member connected to the abutting member. The transmission member can move in a first direction to drive the tightening member to move in a second direction. The driving member can drive the abutting member to abut the guide rod and to drive the transmission member to move in the first direction.

20 Claims, 5 Drawing Sheets

(51) Int. Cl.
*F16M 11/10* (2006.01)
*G03B 17/56* (2021.01)
*F16M 13/04* (2006.01)
*F16M 11/16* (2006.01)
*F16M 11/04* (2006.01)

(52) U.S. Cl.
CPC ........... *F16M 11/16* (2013.01); *G03B 17/561* (2013.01); *F16M 11/123* (2013.01); *F16M 11/18* (2013.01); *F16M 2200/02* (2013.01)

(58) Field of Classification Search
CPC .... F16M 11/16; F16M 11/18; F16M 2200/02; F16M 11/2064; F16M 2200/041; F16M 13/04
See application file for complete search history.

(56) References Cited

U.S. PATENT DOCUMENTS

| | | | |
|---|---|---|---|
| 6,986,491 B2* | 1/2006 | Anderson | F16M 11/041 248/317 |
| 8,141,836 B2* | 3/2012 | Saez | F16M 13/02 248/317 |
| 8,938,161 B2* | 1/2015 | Webb | H04N 5/23258 396/55 |
| 9,574,703 B2* | 2/2017 | Firchau | F16M 11/24 |
| 9,648,240 B2* | 5/2017 | Wang | H04N 7/183 |
| 2010/0243851 A1 | 9/2010 | Murrow et al. | |
| 2014/0037278 A1* | 2/2014 | Wang | H04N 5/2328 396/55 |
| 2016/0201847 A1 | 7/2016 | Firchau et al. | |
| 2018/0335178 A1* | 11/2018 | Bin | F16M 11/18 |

FOREIGN PATENT DOCUMENTS

| | | |
|---|---|---|
| CN | 202392373 U | 8/2012 |
| CN | 203258324 U | 10/2013 |
| CN | 203823376 U | 9/2014 |
| CN | 203951710 U | 11/2014 |
| CN | 104254725 A | 12/2014 |
| CN | 204062364 U | 12/2014 |
| CN | 104395666 A | 3/2015 |
| CN | 104603517 A | 5/2015 |
| CN | 104981644 A | 10/2015 |
| CN | 105518369 A | 4/2016 |
| CN | 206555651 U | 10/2017 |
| WO | 2015022433 A1 | 2/2015 |

* cited by examiner

GIMBAL FRAME, AND GIMBAL AND PHOTOGRAPHING APPARATUS HAVING THE SAME

CROSS-REFERENCE TO RELATED APPLICATION

This application is a continuation of International Application No. PCT/CN2016/112788, filed on Dec. 28, 2016, the entire content of which is incorporated herein by reference.

TECHNICAL FIELD

The disclosure relates to a gimbal frame, a gimbal, and a photographing apparatus having the gimbal frame.

BACKGROUND TECHNOLOGY

A photographing apparatus generally includes a gimbal and a photographing device carried by the gimbal. The gimbal is configured to realize fixing of the photographing device and adjusting attitudes of the photographing device, for example, changing the height and/or direction of the photographing device, and stably maintaining the photographing device in a preset attitude, thereby realizing stable, smooth and multi-angle shooting by the photographing device. An existing gimbal has to adapt to different types of photographing devices and is often assembles and disassembled with the photographing device. In the process of disassembly and assembly, it is necessary to lock or disassemble a plurality of structural parts, the operation is rather cumbersome, and it is easy to cause problems, such as improper operation, and missing operations, etc.

SUMMARY OF THE DISCLOSURE

In accordance with the disclosure, there is provided a gimble frame. The gimbal frame includes a guide rod and a locking mechanism mounted at the guide rod. The locking mechanism includes a tightening member disposed at the guide rod, a transmission member disposed at the guide rod and in transmission engagement with the tightening member, an abutting member disposed at one side of the transmission member, and a driving member connected to the abutting member. The transmission member can move in a first direction to drive the tightening member to move in a second direction. The driving member can drive the abutting member to abut the guide rod and to drive the transmission member to move in the first direction.

Also in accordance with the disclosure, there is provided a gimble. The gimbal includes a gimbal frame for carrying a load and a motor assembly fixed to the gimbal frame. The motor assembly can drive the gimbal frame to rotate. The gimbal frame includes a guide rod and a locking mechanism mounted at the guide rod. The locking mechanism includes a tightening member disposed at the guide rod, a transmission member disposed at the guide rod and in transmission engagement with the tightening member, an abutting member disposed at one side of the transmission member, and a driving member connected to the abutting member. The transmission member can move in a first direction to drive the tightening member to move in a second direction. The driving member can drive the abutting member to abut the guide rod and to drive the transmission member to move in the first direction.

Also in accordance with the disclosure, there is provided an photographing apparatus. The photographing apparatus includes a photographing device and a gimbal. The gimbal includes a gimbal frame for carrying the photographing device and a motor assembly fixed to the gimbal frame. The motor assembly can drive the gimbal to rotate to change a height and a direction of the photographing device and to stably maintain the photographing device in a preset attitude. The gimbal frame includes a guide rod and a locking mechanism mounted at the guide rod. The locking mechanism includes a tightening member disposed at the guide rod, a transmission member disposed at the guide rod and in transmission engagement with the tightening member, an abutting member disposed at one side of the transmission member, and a driving member connected to the abutting member. The transmission member can move in a first direction to drive the tightening member to move in a second direction. The driving member can drive the abutting member to abut the guide rod and to drive the transmission member to move in the first direction.

Compared with the existing technology, the gimbal frame of the present disclosure utilizes a transmission engagement between the driving member and the transmission member of the locking mechanism, and a transmission connection between the transmission member and the tightening member. Only the driving member needs to be operated to lock the first guide rod and the second guide rod of the gimbal frame, and locking a plurality of structures at the same time through operation on only one structure is realized, thereby improving assembly and disassembly efficiency of the gimbal frame and avoiding missing operations.

Figure 1:
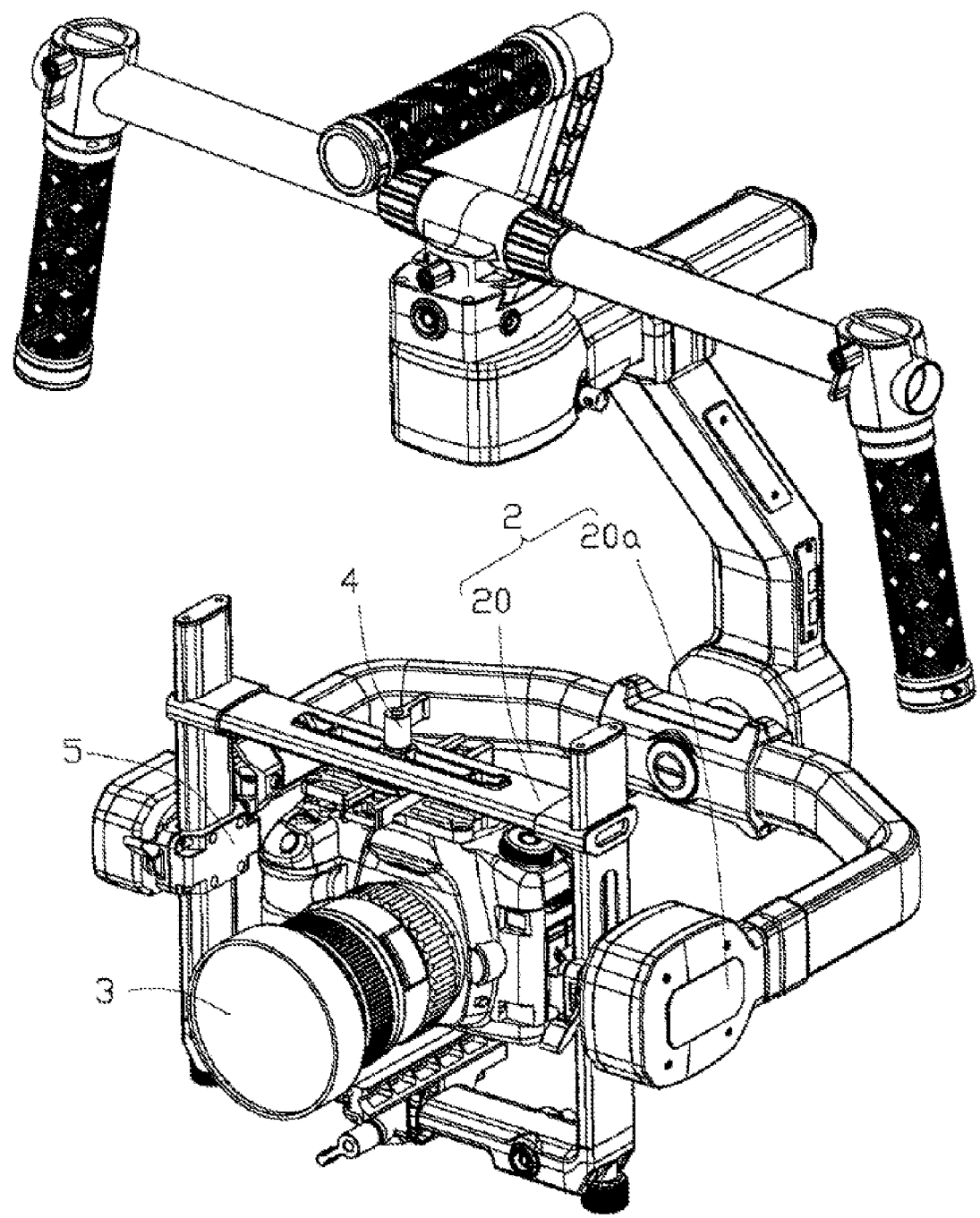
FIG. 1 is a perspective view of an exemplary photographing apparatus including a gimbal frame and a photographing device according to some embodiments of the present disclosure.

| MAIN COMPONENT SYMBOL DESCRIPTION | |
| --- | --- |
| photographing apparatus | 1 |
| gimbal | 2 |
| gimbal frame | 20 |
| Motor assembly | 20a |
| First guide rod | 21 |
| Accommodating groove | 211 |
| Second guide rod | 22 |
| Mounting groove | 221 |
| Third guide rod | 23 |
| Sleeve | 24 |
| Opening | 241 |
| Positioning groove | 242 |
| Mounting plate | 25 |
| Connection part | 251 |
| Bottom plate | 2511 |
| Side wall | 2512 |
| Extension wall | 2513 |
| Sliding groove | 2514 |
| Mounting part | 252 |
| Connection rod | 26 |

-continued

| MAIN COMPONENT SYMBOL DESCRIPTION | |
|---|---|
| Carrying platform | 27 |
| Locking member | 28 |
| End cap | 29 |
| Photographing device | 3 |
| Locking mechanism | 4 |
| Knob | 41 |
| Driving member | 42 |
| Rotating part | 421 |
| Connecting section | 422 |
| Screw joint | 423 |
| Protruding part | 424 |
| Transmission member | 43 |
| Guide groove | 431 |
| Matching groove | 432 |
| Inclined surface | 4321 |
| Flat surface | 4322 |
| Sliding member | 44 |
| First fastening member | 441 |
| First abutting part | 4411 |
| First engaging part | 4412 |
| Second fastening member | 442 |
| Second abutting part | 4421 |
| Second engaging part | 4422 |
| Tightening member | 45 |
| Abutting end | 451 |
| Tightening end | 452 |
| Holding member | 46 |
| Holding surface | 461 |
| Abutting surface | 462 |
| Connection member | 47 |
| Sliding part | 471 |
| Protruding part | 472 |
| Sleeving member | 48 |
| Abutting member | 49 |
| Gravity-center adjustment-and-locking mechanism | 5 |
| Through hole | 4413, 4423, 463, 473 |

The disclosure is further illustrated by the following detailed description in connection with the accompanying drawings.

DETAILED DESCRIPTION OF EMBODIMENTS

Technical solutions of the present disclosure will be described with reference to the accompany drawings of embodiments of the present disclosure. Clearly, the described embodiments are only some of the embodiments of the present disclosure, rather than all of the embodiments of the present disclosure. Other embodiments conceived by those having ordinary skills in the art on the basis of the described embodiments without creative efforts should fall within the protection range of the present disclosure.

It should be noted that, when one component is referred to as "fixed to" another component, the component may be directly attached to the other component, or there may be a mediate component in between. When a component is referred to as "connecting" to another component, the component may be directly connected to the other component, or there may be a mediate component in between. When a component is referred to as "disposed at" another component, the component may be directly disposed at the other component, or there may be a mediate component in between. The terms "perpendicular," "horizontal," "left," "right," and similar expressions used herein are merely intended for descriptive purposes.

Unless otherwise defined, all the technical and scientific terms used herein have the same meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

The present disclosure provides a gimbal frame configured to mount a load. The gimbal frame includes a first guide rod and a second guide rod. The second guide rod is connected to an end of the first guide rod. The gimbal frame further includes a locking mechanism, and the locking mechanism is mounted at the first guide rod. The locking mechanism includes a transmission member disposed at the first guide rod and movable along the first guide rod in a first direction; at least one tightening member disposed at the first guide rod and movable along the first guide rod in a second direction, the tightening member being in transmission engagement with the transmission member, and when moving in the first direction the transmission member being able to drive the tightening member to move in the second direction; an abutting member disposed at one side of the transmission member; and a driving member connected to the abutting member. When the driving member is operated, the driving member is configured to drive the abutting member to move in a direction opposite to the first direction and to abut the first guide rod, and simultaneously drive the transmission member to move along in first direction, so that the transmission member drives the tightening member to move in the second direction to abut the second guide rod.

The present disclosure provides a gimbal, which includes a motor assembly. The gimbal further includes a gimbal frame for mounting a load, and the motor assembly is fixed to the gimbal frame and capable of driving the gimbal frame to rotate. The gimbal frame includes a first guide rod and a second guide rod, and the second guide rod is connected an end of the first guide rod. The gimbal frame further includes a locking mechanism, and the locking mechanism is mounted at the first guide rod. The locking mechanism includes a transmission member disposed at the first guide rod and movable along the first guide rod in a first direction; at least one tightening member disposed at the first guide rod and movable along the first guide rod in a second direction, the tightening member being in transmission engagement with the transmission member, and when moving in the first direction the transmission member being able to drive the tightening member to move in the second direction; an abutting member disposed at one side of the transmission member; and a driving member connected to the abutting member. When the driving member is operated, the driving member is configured to drive the abutting member to move in a direction opposite to the first direction and to abut the first guide rod, and simultaneously drive the transmission member to move in the first direction, so that the transmission member drives the tightening member to move in the second direction to abut the second guide rod.

The present disclosure provides a photographing apparatus, which includes a photographing device. The photographing apparatus further includes a gimbal. The gimbal includes a gimbal frame and a motor assembly configured to drive the gimbal frame. The photographing device is fixed to the gimbal frame. The motor assembly is configured to change a height and/or a direction of the photographing device and to stably maintain the photographing device in a preset attitude. The gimbal frame includes a first guide rod and a second guide rod, and the second guide rod is connected an end of the first guide rod. The gimbal frame further includes a locking mechanism, and the locking mechanism is mounted at the first guide rod. The locking mechanism includes a transmission member disposed at the first guide rod and movable along the first guide rod in a first direction; at least one tightening member disposed at the first guide rod and movable along the first guide rod in a second direction, the tightening member being in transmission engagement with the transmission member, and when moving in the first direction the transmission member being able to drive the tightening member to move in the second direction; an abutting member disposed at one side of the transmission member; and a driving member connected to the abutting member. When the driving member is operated, the driving member is configured to drive the abutting member to move in a direction opposite to the first direction and to abut the first guide rod, and simultaneously drive the transmission member to move in the first direction, so that the transmission member drives the tightening member to move in the second direction to abut the second guide rod.

Some embodiments of the present disclosure are described in detail below with reference to the accompanying drawings. In cases of no conflict, the embodiments and features of the embodiments described below may be combined with each other.

Referring to FIG. 1, in embodiments of the present disclosure, a photographing apparatus 1 includes a gimbal 2 and a photographing device 3. The gimbal 2 includes a gimbal frame 20 and a motor assembly 20a. The motor assembly 20a is mounted at the gimbal frame 20 to drive the gimbal frame 20 to rotate. The photographing device 3 is mounted at the gimbal frame 20. Under the driving of the motor assembly 20a, the gimbal frame 20 can change the height and/or direction of the photographing device 3, and stably maintain the photographing device 3 in a preset attitude. Different types of video cameras or cameras can be employed for the photographing device 3.

In the present embodiment, the motor assembly 20a is a pitch axis motor. The pitch axis motor drives the gimbal frame 20 to rotate around a pitch axis. Further, the gimbal 2 is a three-axis gimbal, so the gimbal 2 may further include a roll axis motor and a yaw axis motor, a roll axis assembly driven by the roll axis motor, and a yaw axis assembly driven by the yaw axis motor, such that the photographing device 3 mounted at the gimbal 2 can be rotated about the pitch axis, the roll axis, and the yaw axis, thereby enabling photographing at a larger angle.

Figure 2:
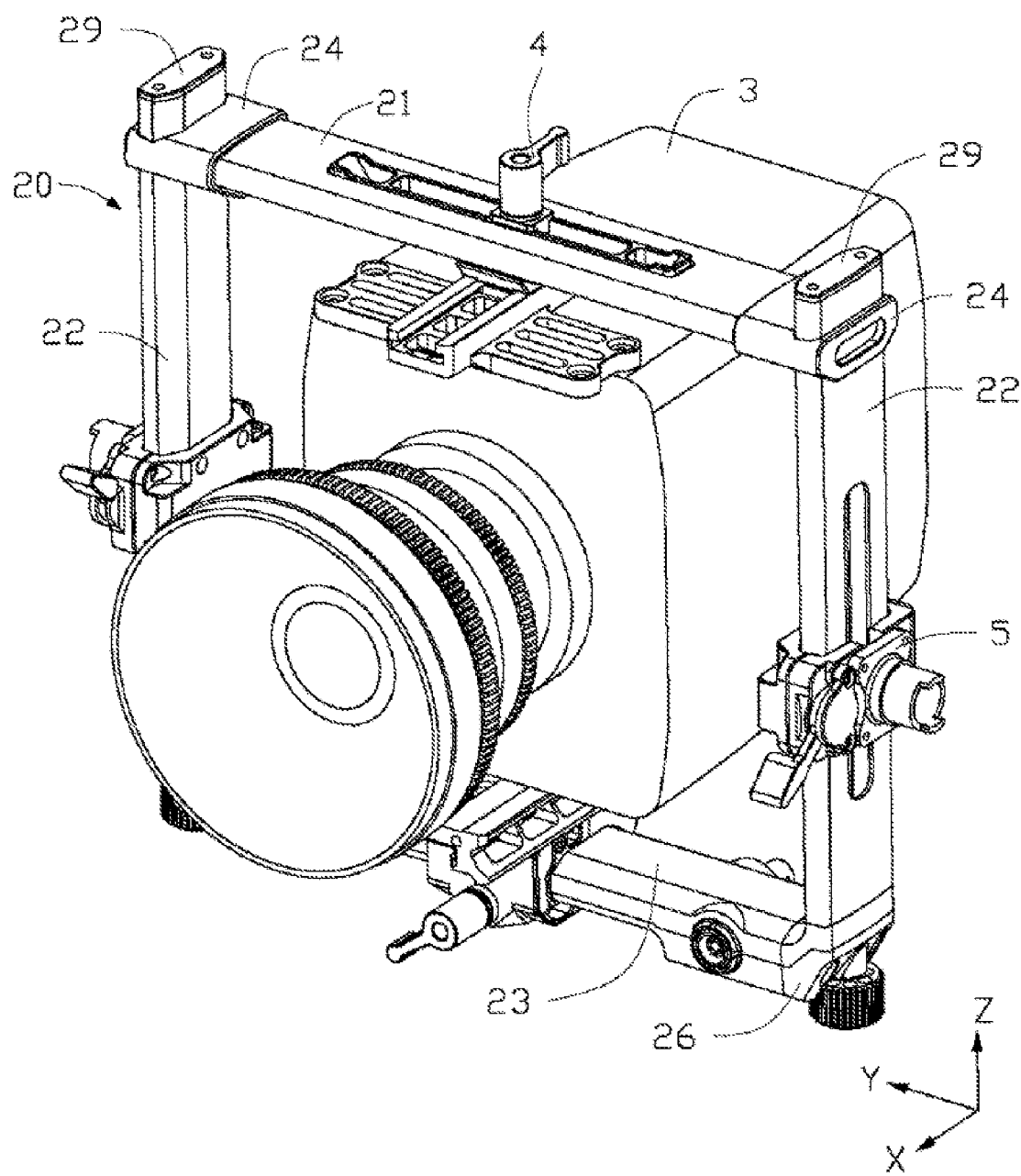
FIG. 2 is a perspective assembled view of the gimbal frame shown in FIG. 1 and another photographing device according to some embodiments of the present disclosure.
Figure 3:
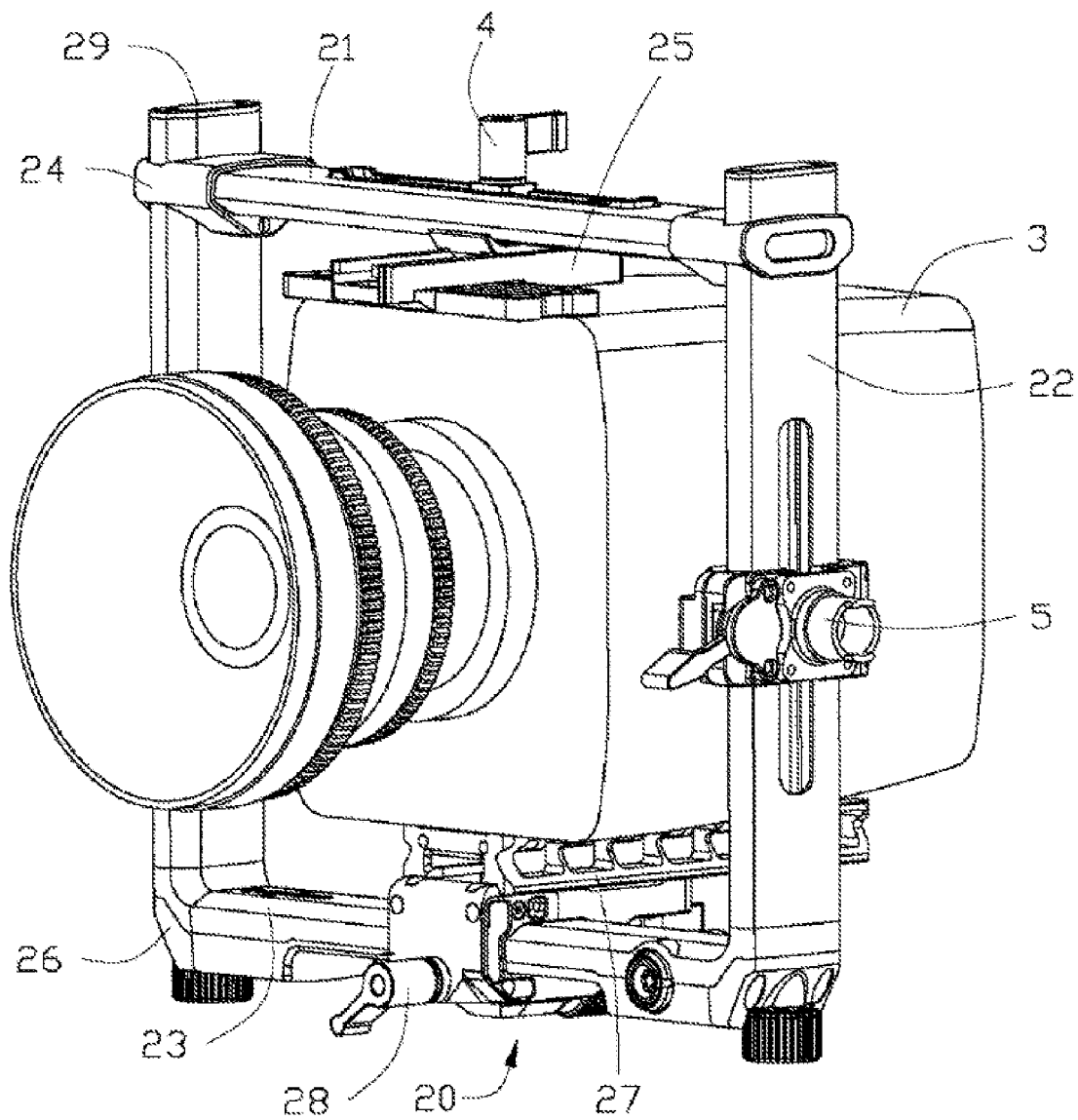
FIG. 3 is a perspective assembled view of the gimbal frame and the photographing device shown in FIG. 2 at another angle.

Referring to FIG. 2 and FIG. 3, the gimbal frame 20 includes a first guide rod 21, two second guide rods 22, two sleeves 24, and a mounting plate 25. The two second guide rods 22 are oppositely disposed and are respectively disposed at two ends of the first guide rod 21 through the sleeve 24. The mounting plate 25 can be slidably disposed at the first guide rod 21 for fixing the photographing device 3. The gimbal frame 20 further includes a locking mechanism 4 to simultaneously lock a plurality of structural components of the gimbal frame 20. In some embodiments, the locking mechanism 4 is disposed at the first guide rod 21, and the mounting plate 25 is disposed at the locking mechanism 4. The locking mechanism 4 is configured to lock the mounting plate 25 of the gimbal frame 20 and the two second guide rods 22.

Figure 4:
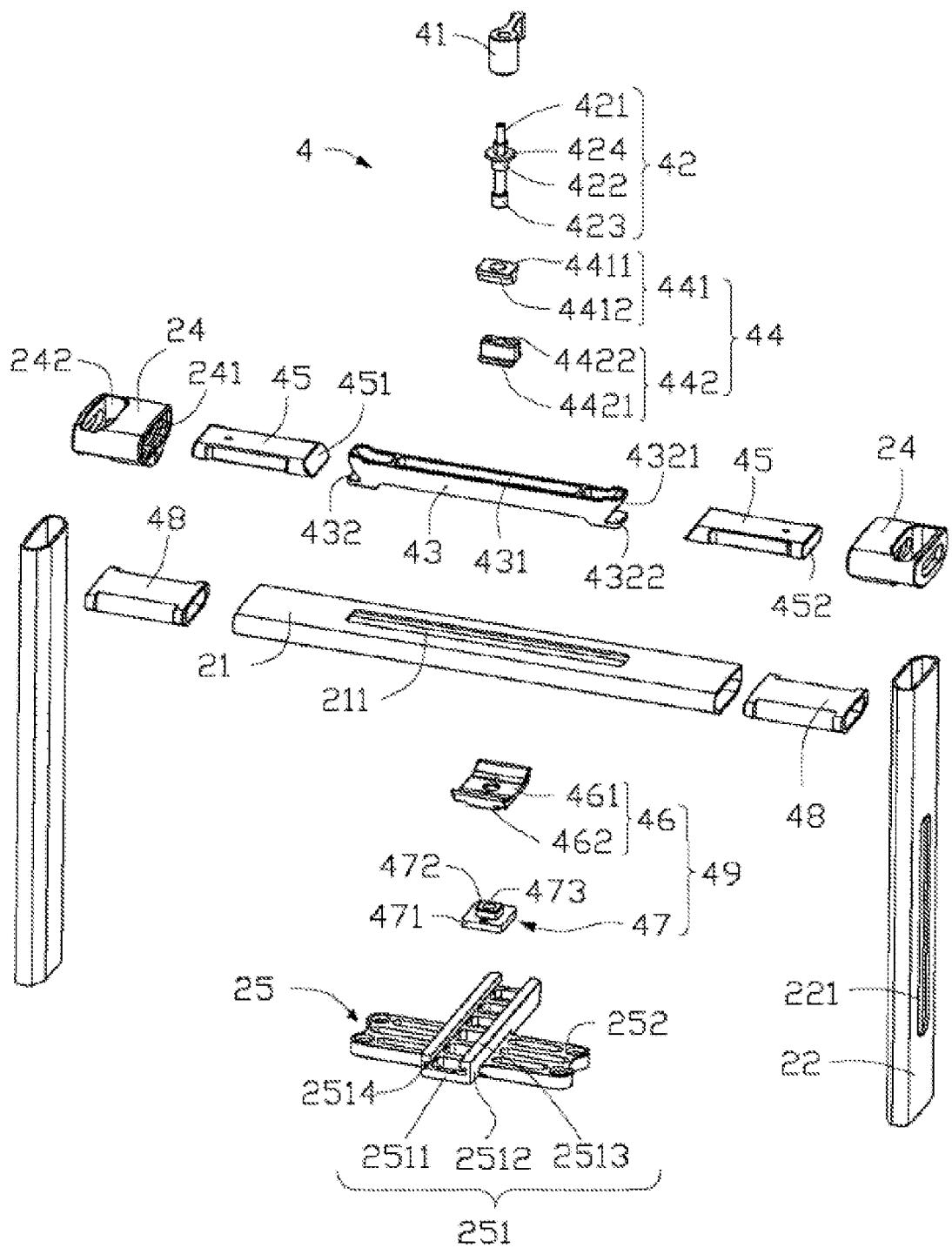
FIG. 4 is an exploded view showing a partial structure of the gimbal frame shown in FIG. 2.

Referring also to FIG. 4, the first guide rod 21 has an elongated strip shape. The first guide rod 21 is a hollow body that is open at both ends. In the present embodiment, the first guide rod 21 is approximately a cuboid. It can be understood that in other embodiments, the first guide rod 21 can also have another shape, such as a hollow cylinder. The first guide rod 21 includes an accommodating groove 211. In the present embodiment, the accommodating groove 211 is disposed at a center position of the first guide rod 21. The accommodating groove 211 extends through two opposite side-surfaces of the first guide rod 21. In the present embodiment, the accommodating groove 211 has an elongated rectangular shape. A longitudinal direction of the accommodating groove 211 is the same as a longitudinal direction of the first guide rod 21.

Each of the second guide rods 22 has an elongated strip shape. The second guide rod 22 is a hollow body that is open at both ends. In the present embodiment, the second guide rod 22 is approximately a cuboid. It can be understood that in other embodiments, the second guide rod 22 can also have another shape, such as a hollow cylinder. A mounting groove 221 is disposed at one side of the second guide rod 22. In the present embodiment, the mounting groove 221 has a rectangular shape. The longitudinal direction of the mounting groove 221 is the same as a longitudinal direction of the second guide rod 22.

Further, the gimbal frame 20 further includes at least one gravity-center adjustment-and-locking mechanism 5. In the present embodiment, the gimbal frame 20 includes two gravity-center adjustment-and-locking mechanisms 5. Two gravity-center adjustment-and-locking mechanisms 5 are respectively fixed at the two second guide rods 22 for adjusting the gravity center of the photographing device 3 to stably maintain the photographing device 3 in a preset attitude. It can be understood that the gravity-center adjustment-and-locking mechanism 5 can also be disposed at other guide rods and is not limited to the second guide rods 22.

Referring to FIG. 2 to FIG. 4 together, the two sleeves 24 are respectively fixed to opposite ends of the first guide rod 21. Each of the sleeves 24 has a strip shape. The sleeve 24 is a hollow body that is open at least at one end. A shape and size of an opening 241 of the sleeve 24 are respectively adapted to the shape and size of the cross section of the first guide rod 21 to be sleeved and fixed at an end of the first guide rod 21. In the present embodiment, the sleeve 24 is approximately a cuboid. It can be understood that in other embodiments, the sleeve 24 can also have another shape, such as a cylinder, etc. The side surface of the sleeve 24 further includes a positioning groove 242. The positioning groove 242 extends through two opposite side surfaces of the sleeve 24 for positioning the two second guide rods 22. In some embodiments, each of the sleeves 24 is sleeved at one end of a corresponding second guide rod 22 through the positioning groove 242.

Figure 5:
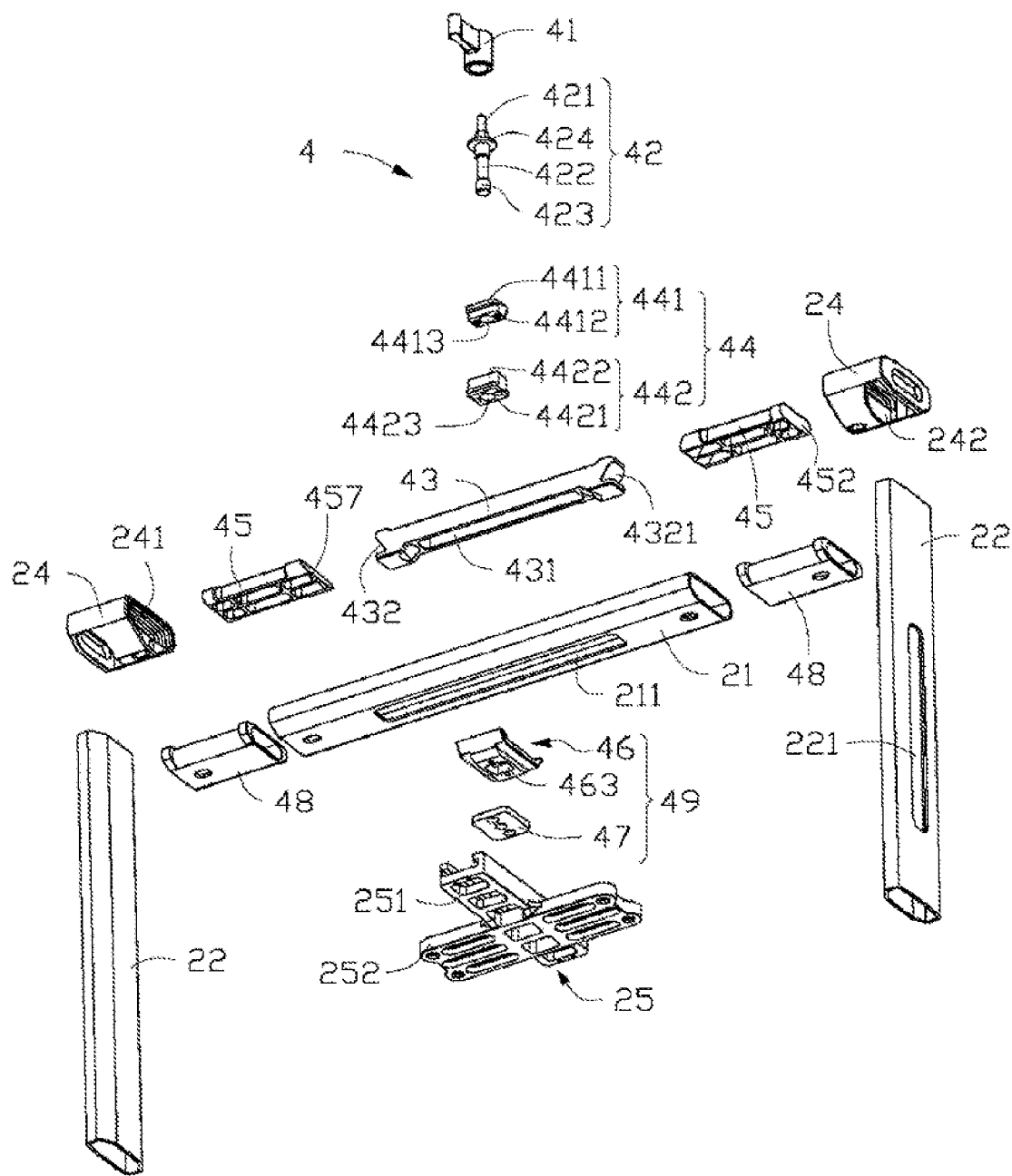
FIG. 5 is an exploded view of the gimbal frame shown in FIG. 4 at another angle.

The mounting plate 25 is fixed to the first guide rod 21 by the locking mechanism 4. The structure of the locking mechanism 4 is shown in FIGS. 4 and 5, which is described in detail later. The locking mechanism 4 is movably mounted at the first guide rod 21, and the mounting plate 25 is slidably coupled to the locking mechanism 4. In some embodiments, the mounting plate 25 includes a connection part 251 and two mounting parts 252. The two mounting parts 252 are respectively disposed at two sides of the connection part 251 and form an approximately "+" shape together with the connection part 251.

The connection part 251 is slidably coupled to the locking mechanism 4. The connection part 251 has an elongated strip shape. In the present embodiment, the connection part 251 is approximately a cuboid. It can be understood that in other embodiments, the connection part 251 can also have another shape. The connection part 251 includes a bottom plate 2511, two side walls 2512, and two extension walls 2513. In the present embodiment, the bottom plate 2511 has a cuboid shape. Two side walls 2512 are respectively disposed at opposite sides of the bottom plate 2511 and disposed perpendicular to the bottom plate 2511. The bottom surfaces of the two side walls 2512 are flush with the bottom surface of the bottom plate 2511. In the present embodiment, the two side walls 2512 are respectively disposed at two longer sides of the bottom plate 2511, and the length thereof is equal to the length of the bottom plate 2511. Two of the extension walls 2513 are respectively formed by inner sides of the top end of the side wall 2512 protruding oppositely. Each of the extension walls 2513 and the corresponding side wall 2512 and the bottom plate 2511 are enclosed to form an elongated sliding groove 2514.

Two of the mounting parts 252 are configured to fix the photographing device 3. Two of the mounting parts 252 are respectively disposed outside the side wall 2512. The bottom surfaces of the two mounting parts 252 are flush with the bottom surface of the bottom plate 2511. The photographing device 3 is fixed to a bottom surface of the mounting part 252.

Further, the gimbal frame 20 may further include a third guide rod 23. The shape of the third guide rod 23 is similar to that of the first guide rod 21. The third guide rod 23 is disposed opposite to the first guide rod 21 and is located between the two second guide rods 22. The third guide rod 23 connects the two second guide rods 22 to make the gimbal frame 20 more stable. In some embodiments, the first guide rod 21, the two second guide rods 22 and the third guide rod 23 together form a quadrangular frame. It can be understood that in other embodiments, the third guide rod 23 can also be omitted, and for example, the part of the second guide rod 22 is a solid structure.

Further, the gimbal frame 20 may further include two connection rods 26. Each of the connection rods 26 is disposed between the second guide rod 22 and the third guide rod 23 for connecting the second guide rod 22 and the third guide rod 23. It can be understood that in other embodiments, the connection rod 26 can also be omitted.

Further, the gimbal frame 20 may further include a carrying platform 27. The carrier 27 is fixed to the third guide rod 23 by a locking member 28. The carrying platform 27 is configured to carry a part of the weight of the photographing device 3. It should be understood that in other embodiments, the carrying platform 27 and the locking member 28 may also be omitted.

Further, the gimbal frame 20 may further include two end caps 29. The two end caps 29 are respectively fixed to top ends of the two second guide rods 22 for sealing the second guide rods 22. It can be understood that in other embodiments, the end cap 29 can also be omitted.

For convenience of explanation, a direction X, a direction Y, and a direction Z are defined as shown in FIG. 2, and the direction X, the direction Y, and the direction Z are perpendicular to each other.

Referring to FIGS. 2, 4 and 5, the locking mechanism 4 includes a driving member 42, a transmission member 43, at least one tightening member 45, and an abutting member 49. The transmission member 43 is disposed at the first guide rod 21 and is movable along the first guide rod 21 in a first direction (a direction opposite to the direction Z). The tightening member 45 is disposed at the first guide rod 21 and is movable along the first guide rod 21 in the second direction (the direction Y). The tightening member 45 is in transmission engagement with the transmission member 43. When moving in the first direction, the transmission member 43 is configured to drive the tightening member 45 to move in the second direction. The abutting member 49 is disposed at one side of the transmission member 43. The driving member 42 is coupled to the abutting member 49. When the driving member 42 is operated, the driving member 42 can drive the abutting member 49 to move in the opposite direction of the first direction (the direction Z) and abut the first guide rod 21, and can simultaneously drive the transmission member 43 to move in the first direction such that the transmission member 43 drives the tightening member 45 to move in the second direction to tighten the second guide rod 22.

In the present embodiment, the locking mechanism 4 includes two tightening members 45. The two tightening members 45 are respectively disposed at two ends of the transmission member 43 and are transmitting connected to the transmission member 43. The locking mechanism 4 also includes a sliding member 44. The sliding member 44 can be movably mounted at the transmission member 43 to limit the transmission member 43 within the first guide rod 21. The abutting member 49 includes a holding member 46 and a connection member 47. The driving member 42 successively passes through the transmission member 43, the sliding member 44, and the holding member 46, and is connected to the connection member 47.

In the present embodiment, a screwing member can be used as the driving member 42, and the driving member 42 is screwed to the abutting member 49. It can be understood that in other embodiments, other structural member can be used as the driving member 42 such as a stud, a telescopic sleeve, etc.

In some embodiments, the driving member 42 includes a rotating part 421, a connecting section 422, and a screwing member 423. The connecting section 422 is disposed between the rotating part 421 and the screw joint 423. In the present embodiment, the rotating part 421, the connecting section 422, and the screw joint 423 all have a cylindrical shape. The connecting section 422 is configured to pass through the sliding member 44 and the holding member 46 and is rotatably connected thereto. The screwing member 423 is for screwing the connection part 47. The driving member 42 further includes a protruding part 424. The protruding part 424 is formed to extend perpendicularly outward from the outer periphery of the rotating part 421. The connecting section 422 abuts the protruding part 424. While installation, the protruding part 424 abuts against the sliding member 44. Further, the locking mechanism 4 further includes a knob 41. The knob 41 is fixed to the rotating part 421 of the driving member 42 for rotating the driving member 42.

The transmission member 43 has an elongated strip shape. The shape of the transmission member 43 match the shape of the accommodating groove 211 of the first guide rod 21. The transmission member 43 is accommodated in the accommodating groove 211 of the first guide rod 21. In the present embodiment, the transmission member 43 is approximately cuboid. The thickness of the transmission member 43 is slightly smaller than the thickness of the first guide rod 21. A guide groove 431 is disposed at the transmission member 43. The guide groove 431 faces toward the accommodating groove 211 of the first guide rod 21. In the present embodiment, the guide groove 431 is disposed at a center position of the transmission member 43. The guide groove 431 extends through two opposite sides of the transmission member 43. In the present embodiment, the guide groove 431 has a rectangular shape. The longitudinal direction of the guide groove 431 is the same as the longitudinal direction of the transmission member 43.

The two ends of the transmission member 43 also respectively include matching grooves 432. Two of the matching grooves 432 are located at both ends of the guide groove 431 and spaced apart therefrom. An end surface of the transmission member 43 recesses inward to form the matching groove 432. The matching groove 432 includes an inclined surface 4321 and a flat surface 4322. The inclined surface 4321 and the flat surface 4322 together form the matching groove 432, which is configured to partially accommodate the tightening member 45. The inclined surface 4321 intersects with the flat surface 4322, forming an acute angle.

The sliding member 44 is mounted at the guide groove 431 of the transmission member 43 and is accommodated in the first guide rod 21. In some embodiments, the sliding member 44 is partially accommodated in the guide groove 431. When the locking mechanism 4 is not locked, the sliding member 44 is slidable along the guide groove 431 to adjust and change the position of the photographing device 3 in the direction Y.

The sliding member 44 includes a first fastening member 441 and a second fastening member 442. The first fastening member 441 and the second fastening member 442 are fixedly connected to and sleeved at the guide groove 431 and are engaged with the two ends of the opening of the guide groove 431. The first fastening member 441 and the second fastening member 442 are respectively located at opposite sides of the transmission member 43.

In some embodiments, the first fastening member 441 includes a first abutting part 4411 and a first engaging part 4412. The first abutting part 4411 is a flat plate. In the present embodiment, the first abutting part 4411 is approximately a cuboid but is not limited thereto. The first engaging part 4412 is formed by a middle of a side of the first abutting part 4411 extending outward. In the present disclosure, the first fastening member 441 has a T-shaped transverse cross section. The height of the first engaging part 4412 is smaller than the height of the transmission member 43. The first engaging part 4412 is accommodated in the guide groove 431 of the transmission member 43, while the first abutting part 4411 abuts a side surface of the transmission member 43. The first fastening member 441 further includes a through hole 4413, which is configured to penetrating mount the driving member 42. In some embodiments, the through hole 4413 is disposed at the center of the first fastening member 441. The through hole 4413 passes through the first abutting part 4411 and the first engaging part 4412.

The shape of the second fastening member 442 is similar to that of the first fastening member 441. The second fastening member 442 includes a second abutting part 4421 and a second engaging part 4422. The second abutting part 4421 is a flat plate. In the present embodiment, the second abutting part 4421 is approximately a cuboid but is not limited thereto. The second engaging part 4422 is formed by a middle of a side of the second abutting part 4421 extending outward. In the present disclosure, the second fastening member 442 has a T-shaped transverse cross section. The second engaging part 4422 and the first engaging part 4412 are relatively fixed. A sum of the height of the first engaging part 4412 and the height of the second engaging part 4422 is equal to the height of the transmission member 43. The height of the first engaging part 4412 and the height of the second engaging part 4422 can be respectively divided according to actual conditions. The second engaging part 4422 is accommodated in the guide groove 431 of the transmission member 43, while the second abutting part 4421 abuts against the lower surface of the first guide rod 21. The second fastening member 442 further includes a through hole 4423, which is configured to penetrating mount the driving member 42. In some embodiments, the through hole 4423 is disposed at the center of the second fastening member 442. The through hole 4423 extends through the second abutting part 4421 and the second engaging part 4422.

The two tightening members 45 are movably accommodated in the first guide rod 21 and respectively located at opposite ends of the transmission member 43. Each of the top members 45 includes an abutting end 451 and a tightening end 452. The abutting end 451 and the tightening end 452 are disposed opposite each other. The abutting end 451 faces toward the transmission member 43 and is partially accommodated in the matching groove 432 of the transmission member 43. The end surface of the abutting end 451 has a slope and matches the inclined surface 4321 of the matching groove 432. The tightening end 452 faces toward the second guide rod 22 and is configured to tighten the second guide rod 22.

In the present embodiment, the transmission connection between the tightening member 45 and the transmission member 43 is achieved by a bevel connection between the inclined surface 4321 of the matching groove 432 and the end surface of the abutting end 451. It can be understood that in other embodiments, the transmission connection between the tightening member 45 and the transmission member 43 can also be implemented in another manner, such as a gear transmission.

Further, the locking mechanism 4 can also include two sleeving members 48. Each of the sleeving members 48 is a hollow body that is open at both ends and is configured to be sleeved by the tightening member 45. The sleeving member 48 is accommodated and fixed to a portion of the first guide rod 21 near two ends. In the present embodiment, the sleeving member 48 together with the sleeve 24 at the same end of the first guide rod 21 is fixed to the first guide rod 21. The length of the sleeving member 48 is smaller than the length of the tightening member 45, such that two ends of the tightening member 45 can extend from the opening ends of the sleeving member 48. It can be understood that in other embodiments, the sleeving member 48 may also be omitted.

The holding member 46 is located below the first guide rod 21. The holding member 46 includes a holding surface 461 and an abutting surface 462. The holding surface 461 is disposed opposite to the abutting surface 462. The holding surface 461 is disposed facing toward the first guide rod 21. The shape of the holding surface 461 matches the bottom surface and a portion of the side surface of the first guide rod 21. During installation, the holding surface 461 abuts against the outer surface of the first guide rod 21. The abutting surface 462 is disposed facing toward the connection member 47. The shape of the abutting surface 462 matches the upper surface of the connection member 47. In the present embodiment, the abutting surface 462 is a flat surface. During installation, the abutting surface 462 abuts against the connection member 47. The holding member 46 further includes a through hole 463, which is configured to penetrating mount the driving member 42. In some embodiments, the through hole 463 is disposed at the center of the holding member 46. The through hole 463 extends through the holding member 46.

The connection member 47 is screwed to the screwing member 423 of the driving member 42 and is configured to be slidably connected to the mounting plate 25. The connection member 47 includes a sliding part 471 and a protruding part 472. The sliding part 471 is a flat plate. In the present embodiment, the sliding part 471 is approximately a cuboid, but is not limited thereto. The sliding part 471 is accommodated in the sliding groove 2514 of the mounting plate 25 and is movable along the sliding groove 2514 to adjust and change the position of the photographing device 3 in the direction X. The protruding part 472 is formed by a middle of a side of the sliding part 471 extending vertically outward. In the present embodiment, the connection member 47 has an inverted T-shaped cross section. The width of the protruding part 472 is smaller than the width of the sliding part 471. The protruding part 472 is located between the two extension walls 2513 of the mounting plate 25 and faces toward the holding member 46. The connection member 47 further includes a through hole 473, which is configured to screw the driving member 42. Preferably, the through hole 473 is disposed at the center of the connection member 47. In the present embodiment, the through hole 473 extends through the sliding part 471 and the protruding part 472.

Referring to FIG. 2, FIG. 4 and FIG. 5 simultaneously, when the locking mechanism 4 is installed, the two sleeving members 48 are respectively inserted into the inside from the two ends of the first guide rod 21 and are fixed to a portion of the first guide rod 21 near the two ends thereof. The transmission member 43 is disposed in the accommodating groove 211 of the first guide rod 21, and the first fastening member 441 is fixed with respect to the second fastening member 442 at the same time, so that the first abutting part 4411 abuts a side surface of the transmission member 43 and an upper surface of the first guide rod 21, and the second abutting part 4421 abuts the other side surface of the transmission member 43 and a lower surface of the first guide rod 21. The two tightening members 45 are respectively inserted to the inner sleeving member 48 from the two ends of the first guide rod 21, and as such, the abutting end 451 is partially accommodated in the matching groove 432 of the transmission member 43. The knob is fixed to one end of the driving member 42, so that, the other end of the driving member 42 successively passes through the through hole 4413 of the first fastening member 441, the through hole 4423 of the second fastening member 442, the through hole 463 of the holding member 46, and the through hole 473 of the connection member 47, and screw joint 423 of the driving member 42 is screwed to the through hole 473 of the connection member 47. Meanwhile, a bottom surface of the protruding part 424 abuts against a top surface of the first fastening member 441. The sleeve 24, the second guide rod 22 and the mounting plate 25 are installed. The two sleeves 24 are respectively sleeve disposed and fixed at two ends of the first guide rod 21. One end of each of the two second guide rod 22 is respectively positioned at the positioning grooves 242 of the two sleeves 24. Meanwhile, the two-fastening ends 452 of two tightening members 45 respectively abut against the side surfaces of the two second guide rods 22. The mounting plate 25 is slidably mounted at the connection member 47, so that the sliding part 471 of the connection member 47 is accommodated in the sliding groove 2514 of the mounting plate 25.

Before the locking mechanism 4 performs the locking operation, the sliding member 44 can be moved along the guide groove 431 of the transmission member 43, so as to drive the driving member 42 and the connection member 47 sleeved at the driving member 42 to move in the direction Y, thereby adjusting and changing the location of the photographing device 3 mounted at the mounting plate 25.

When the locking mechanism 4 is locked, the knob 41 is rotated, so that the screw joint 423 of the driving member 42 is further screwed with the connection member 47. Meanwhile, the connection part 47 is moved upward, and the mounting plate 25 is tightened, so that the mounting plate 25 is locked. While the connection member 47 is moved upward, the holding member 46 is pushed to grab the first guide rod 21, thereby locking the holding member 46. Meanwhile, the distance between the top surface of the connection member 47 and the protruding part 424 is shortened due to the upward movement of the connection member 47. The protruding part 424 of the driving member 42 presses the first portion to move the fastening member 441 downward. The first fastening member 441 pushes the second fastening member 442 to move downward, thereby driving the transmission member 43 to move downward. Because the two ends of the transmission member 43 have inclined surfaces 4321, while the transmission member 43 is moved downward, the inclined surface 4321 thereof forcibly moves the tightening member 45 engaging abutting against thereof toward the second guide rod 22, the two second guide rods 22 are locked.

Compared with the existing technology, the gimbal frame 20 of the present disclosure utilizes the transmission engagement between the driving member 42 of the locking mechanism 4 and the transmission member 43, the transmission connection between the transmission member 43 and the tightening member 45, and the engaging connection between the connection member 47 and the mounting plate 25, the first guide rod 21, the two second guide rods 22 and the mounting plate of the gimbal frame 20 can be simultaneously locked by only operating the driving member 42, realizing that multiple structures can be locked at the same time by operating only one structure, which greatly improves the disassembly and assembly efficiency of the gimbal frame 20 and avoids missing operations.

The above embodiments are only intended to illustrate rather than limit the technical solutions of the present disclosure. Although the present disclosure describes in detail with reference to the preferred embodiments of the present disclosure, persons with ordinary skills in the art should understand, the technical solutions of the present disclosure can be modified or equally substituted, neither of which should deviate from the spirit and scope of the technical solutions of the present disclosure. Those skilled in the art can also make other variations and the like within the spirit of the present disclosure for using in the design of the present disclosure, as long as it does not deviate from the technical effects of the present disclosure. All changes made in accordance with the spirit of the disclosure are intended to be included within the protection scope of claims of the present disclosure.

What is claimed is:

1. A gimbal frame comprising:
  a guide rod; and
  a locking mechanism mounted at the guide rod and comprising:
    a tightening member disposed at the guide rod;
    a transmission member disposed at the guide rod and in transmission engagement with the tightening member, the transmission member being configured to move in a first direction to drive the tightening member to move in a second direction;
    an abutting member disposed at one side of the transmission member; and
    a driving member connected to the abutting member, and configured to drive the abutting member to abut the guide rod and to drive the transmission member to move in the first direction, wherein:
  the guide rod is a first guide rod; and
  the gimbal frame further comprises:
    a mounting plate slidably disposed at the first guide rod; and two second guide rods oppositely disposed at two ends of the first guide rod, respectively;

wherein the locking mechanism is configured to lock the mounting plate and the two second guide rods.

2. The gimbal frame according to claim 1, wherein:
the tightening member is a first tightening member in transmission engagement with one end of the transmission member;
the first tightening member is configured to tighten one of the two second guide rods; and
the locking mechanism further includes a second tightening member in transmission engagement with another end of the transmission member and configured to tighten another one of the two second guide rods.

3. The gimbal frame according to claim 2, further comprising:
a third guide rod disposed opposite to the first guide rod and located between and connected to the two second guide rods;
wherein the first guide rod, the two second guide rods, and the third guide rod together form a quadrilateral frame body.

4. The gimbal frame of claim 3, further comprising:
a gravity-center adjustment-and-locking mechanism configured to adjust a gravity center of the gimbal frame, the gravity-center adjustment-and-locking mechanism being arranged at one of the first guide rod, the two second guide rods, and the third guide rod.

5. The gimbal frame according to claim 1, wherein the tightening member includes an abutting end facing the transmission member and in transmission connection with an end of the transmission member.

6. The gimbal frame according to claim 5, wherein:
the end of the transmission member includes an inclined surface; and
an end surface of the abutting end includes a slope and is engaged with the inclined surface of the transmission member.

7. The gimbal frame according to claim 1, wherein:
the driving member comprises a screw joint screwed to the abutting member; and
the driving member is configured to drive the abutting member to abut against the guide rod in response to the screw joint rotating in a predetermined direction.

8. The gimbal frame according to claim 7, wherein:
the driving member further comprises a connecting section sleeve disposed inside the transmission member; and
the screw joint is disposed at one end of the connecting section.

9. The gimbal frame according to claim 1, wherein:
the transmission member is accommodated in the guide rod;
the transmission member includes a guide groove; and
the driving member passes through the guide rod and the guide groove to be connected to the abutting member.

10. The gimbal frame according to claim 9, wherein:
the locking mechanism further comprises a sliding member mounted at the guide groove and accommodated in the guide rod; and
the sliding member is configured to be slidable along the guide groove when the locking mechanism is not locked.

11. The gimbal frame according to claim 1, wherein:
the abutting member comprises:
a connection member; and
a holding member disposed between the guide rod and the connection member, and being drivingly coupled to the connection member; and
the driving member passes through the transmission member and the holding member.

12. The gimbal frame according to claim 11, wherein:
the holding member comprises:
a holding surface facing the guide rod; and
an abutting surface disposed opposite to the holding surface and facing the connection member; and
the connection member is configured to abut against the abutting surface in response to the driving member being operated, and the holding surface is configured to grab the guide rod in response to the driving member being operated.

13. The gimbal frame according to claim 11, further comprising:
a mounting plate connected to the connection member and configured to fix a load;
wherein the driving member is configured to drive the connection member to abut against the mounting plate to lock the mounting plate in response to the driving member being operated.

14. A gimbal comprising:
a gimbal frame configured to carry a load; and
a motor assembly fixed to the gimbal frame and configured to drive the gimbal frame to rotate;
wherein the gimbal frame comprises:
a guide rod; and
a locking mechanism mounted at the guide rod and comprising:
a tightening member disposed at the guide rod;
a transmission member disposed at the guide rod and in transmission engagement with the tightening member, the transmission member being configured to move in a first direction to drive the tightening member to move in a second direction;
an abutting member disposed at one side of the transmission member; and
a driving member connected to the abutting member, and configured to drive the abutting member to abut the guide rod and to drive the transmission member to move in the first direction.

15. The gimbal according to claim 14, wherein:
the guide rod is a first guide rod; and
the tightening member is a first tightening member in transmission engagement with one end of the transmission member;
the gimbal frame further comprising:
two second guide rods respectively connected to two opposite ends of the first guide rod;
wherein:
the first tightening member is configured to tighten one of the two second guide rods; and
the locking mechanism further includes a second tightening member in transmission engagement with another end of the transmission member and configured to tighten another one of the two second guide rods.

16. The gimbal according to claim 14, wherein:
the driving member comprises a screw joint screwed to the abutting member; and
the driving member is configured to drive the abutting member to abut against the guide rod in response to the screw joint rotating in a predetermined direction.

17. The gimbal according to claim 14, wherein:
the transmission member is accommodated in the guide rod;
the transmission member includes a guide groove; and
the driving member passes through the guide rod and the guide groove to be connected to the abutting member.

18. The gimbal according to claim 17, wherein:
the locking mechanism further comprises a sliding member mounted at the guide groove and accommodated in the guide rod; and
the sliding member is configured to be slidable along the guide groove when the locking mechanism is not locked.

19. The gimbal according to claim 14, wherein:
the abutting member comprises:
a connection member; and
a holding member disposed between the guide rod and the connection member, and being drivingly coupled to the connection member; and
the driving member passes through the transmission member and the holding member.

20. A photographing apparatus, comprising:
a photographing device; and
a gimbal comprising:
a gimbal frame configured to carry the photographing device; and
a motor assembly fixed to the gimbal frame and configured to drive the gimbal frame to rotate to change a height and a direction of the photographing device and to stably maintain the photographing device in a preset attitude,
wherein the gimbal frame comprises:
a guide rod; and
a locking mechanism mounted at the guide rod and comprising:
a tightening member disposed at the guide rod;
a transmission member disposed at the guide rod and in transmission engagement with the tightening member, the transmission member being configured to move in a first direction to drive the tightening member to move in a second direction;
an abutting member disposed at one side of the transmission member; and
a driving member connected to the abutting member, and configured to drive the abutting member to abut the guide rod and to drive the transmission member to move in the first direction.

* * * * *